United States Patent
Graham

(10) Patent No.: US 11,161,436 B1
(45) Date of Patent: Nov. 2, 2021

(54) HEATED SEAT FOR MOBILE HYDRAULIC EQUIPMENT

(71) Applicant: Altec Industries, Inc., Birmingham, AL (US)

(72) Inventor: Brian R. Graham, St. Joseph, MO (US)

(73) Assignee: Altec Industries, Inc., Birmingham, AL (US)

( * ) Notice: Subject to any disclaimer, the term of this patent is extended or adjusted under 35 U.S.C. 154(b) by 0 days.

(21) Appl. No.: 17/098,780

(22) Filed: Nov. 16, 2020

(51) Int. Cl.
*E21B 7/02* (2006.01)
*B60N 2/56* (2006.01)

(52) U.S. Cl.
CPC ...... *B60N 2/5614* (2013.01); *B60Y 2400/302* (2013.01); *E21B 7/02* (2013.01)

(58) Field of Classification Search
CPC ...... B60H 1/00285; B60H 2001/00307; B60N 2/5607; B60N 2/5614
See application file for complete search history.

(56) References Cited

U.S. PATENT DOCUMENTS

| | | | | |
|---|---|---|---|---|
| 6,029,445 A * | 2/2000 | Lech | ...... | E02F 9/2203 60/422 |
| 7,873,451 B2 * | 1/2011 | Hartmann | ...... | B60N 2/5685 701/36 |
| 10,603,976 B2 * | 3/2020 | Androulakis | ...... | B60H 1/00028 |
| 2001/0022222 A1 * | 9/2001 | Aoki | ...... | B60N 2/5657 165/203 |
| 2007/0035162 A1 * | 2/2007 | Bier | ...... | B60N 2/56 297/180.15 |
| 2012/0079837 A1 * | 4/2012 | Maranville | ...... | B60H 1/00478 62/3.61 |
| 2015/0096758 A1 * | 4/2015 | Babbitt | ...... | E21B 33/064 166/335 |
| 2015/0125248 A1 * | 5/2015 | Sasaki | ...... | E02F 9/16 414/744.2 |
| 2018/0163614 A1 * | 6/2018 | Yerace | ...... | F02D 41/1446 |
| 2019/0283650 A1 * | 9/2019 | Senf, Jr. | ...... | B60P 3/20 |
| 2020/0130467 A1 * | 4/2020 | Imaizumi | ...... | B60H 1/00849 |

FOREIGN PATENT DOCUMENTS

FR 3078390 B1 8/2019
RU 2402697 C1 10/2010

* cited by examiner

*Primary Examiner* — Jianying C Atkisson
*Assistant Examiner* — Meraj A Shaikh
(74) *Attorney, Agent, or Firm* — Erise IP, P.A.

(57) ABSTRACT

A system and method for providing heating to a seat of a mobile hydraulic equipment. The system includes a heat exchanger disposed in or adjacent the seat for recycling the heat from a return hydraulic fluid received from a diverter manifold to heat the operator's seat. A valve disposed within the diverter manifold routes the return fluid to one or more of the heat exchanger or a return fluid reservoir based on a control signal received from a controller.

20 Claims, 6 Drawing Sheets

HEATED SEAT FOR MOBILE HYDRAULIC EQUIPMENT

BACKGROUND

1. Field

Embodiments of the invention relate to heated seats in a vehicle. More specifically, embodiments of the invention relate to heated seats for mobile hydraulic equipment.

2. Related Art

Typically, in mobile hydraulic equipment applications a process fluid, such as pressurized hydraulic oil, is circulated through a hydraulic circuit of the mobile hydraulic equipment to transmit hydraulic power. In many cases, the transmission of hydraulic power within the mobile hydraulic equipment creates excess heat within the hydraulic oil. Accordingly, the temperature of the hydraulic oil as it returns to a return fluid reservoir may be relatively high. Existing systems may provide active cooling to the return fluid using a cooling device such as an oil cooler disposed either within the return fluid reservoir or in the hydraulic circuit before the reservoir. Said existing systems typically require active cooling which is inefficient and relies on an additional source of power for cooling, such as electrical power.

Further, in some cases, mobile hydraulic equipment may be operated outside in cold weather, where an operator sits on a seat of the mobile hydraulic equipment inputting controls. Here, the operator may sit for extended periods of time, limiting blood flow and reducing natural circulation which would keep the operator warm.

Accordingly, what is needed is a system and method for heating a seat of a mobile hydraulic equipment that utilizes excess heat from the return fluid of the mobile hydraulic equipment's hydraulic circuit.

SUMMARY

Embodiments of the invention solve the above-mentioned problems by providing a heated seat for mobile hydraulic equipment heated using a return fluid of the mobile hydraulic equipment. In some embodiments, the system includes a heated seat, a heat exchanger, and a diverter manifold configured to route the return fluid into the heat exchanger.

A first embodiment of the invention is directed to a system for recirculating heat in a mobile hydraulic equipment, the system comprising a seat attached to the mobile hydraulic equipment configured to support an operator of the mobile hydraulic equipment, a heat exchanger disposed within or adjacent to the seat having a first circuit with a first fluid and a second circuit with a second fluid, the heat exchanger configured to transfer heat from the first fluid to the second fluid, wherein the second circuit circulates the second fluid through the seat to thereby provide heating to the seat, a diverter manifold for receiving the first fluid from the mobile hydraulic equipment, the diverter manifold comprising a valve for selectively diverting the first fluid to one of the heat exchanger or a return fluid reservoir of the mobile hydraulic equipment, a first temperature sensor disposed within the diverter manifold to measure a temperature of the first fluid within the diverter manifold, and a controller for controlling the valve of the diverter manifold based on a received operator input and the temperature measured by the first temperature sensor.

A second embodiment of the invention is directed to a method for heating a seat of a mobile hydraulic equipment, the method comprising the steps of receiving a return fluid from the mobile hydraulic equipment into a diverter manifold, in a first configuration of a valve disposed within the diverter manifold, diverting at least a portion of the return fluid into a return fluid reservoir of the mobile hydraulic equipment, in a second configuration of the valve disposed within the diverter manifold, diverting at least a portion of the return fluid into a heat exchanger disposed within or adjacent to the seat to thereby provide heating to the seat, measuring a first temperature of the return fluid using a first temperature sensor disposed within the diverter manifold, measuring a second temperature of the return fluid using a second temperature sensor disposed within the heat exchanger, and controlling the heating of the seat using a controller to adjust the valve between one of the first configuration and the second configuration based on a received operator input, the first temperature, and the second temperature.

A third embodiment of the invention is directed to a heated seat for a mobile hydraulic equipment, the heated seat comprising a frame, a cushion for supporting a user thereon secured to the frame, a covering on the cushion, a heat exchanger configured to receive a return fluid from a diverter manifold of the mobile hydraulic equipment, and to provide heating to the seat, and a first temperature sensor disposed within the heat exchanger to measure a first temperature of at least one fluid within the heat exchanger, wherein the diverter manifold comprises a selectively controllable valve configured to direct the return fluid to a return fluid reservoir in a first configuration and to direct the return fluid to the heat exchanger in a second configuration based at least in part on the first temperature of the at least one fluid within the heat exchanger.

Additional embodiments of the invention are directed to a dual heating circuit comprising a first heating circuit providing a first fluid path for a return fluid of a mobile hydraulic equipment through a heat exchanger and a second heating circuit providing a second fluid path for a second fluid through the heat exchanger and through a plurality of fluid channels disposed within a heated seat.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
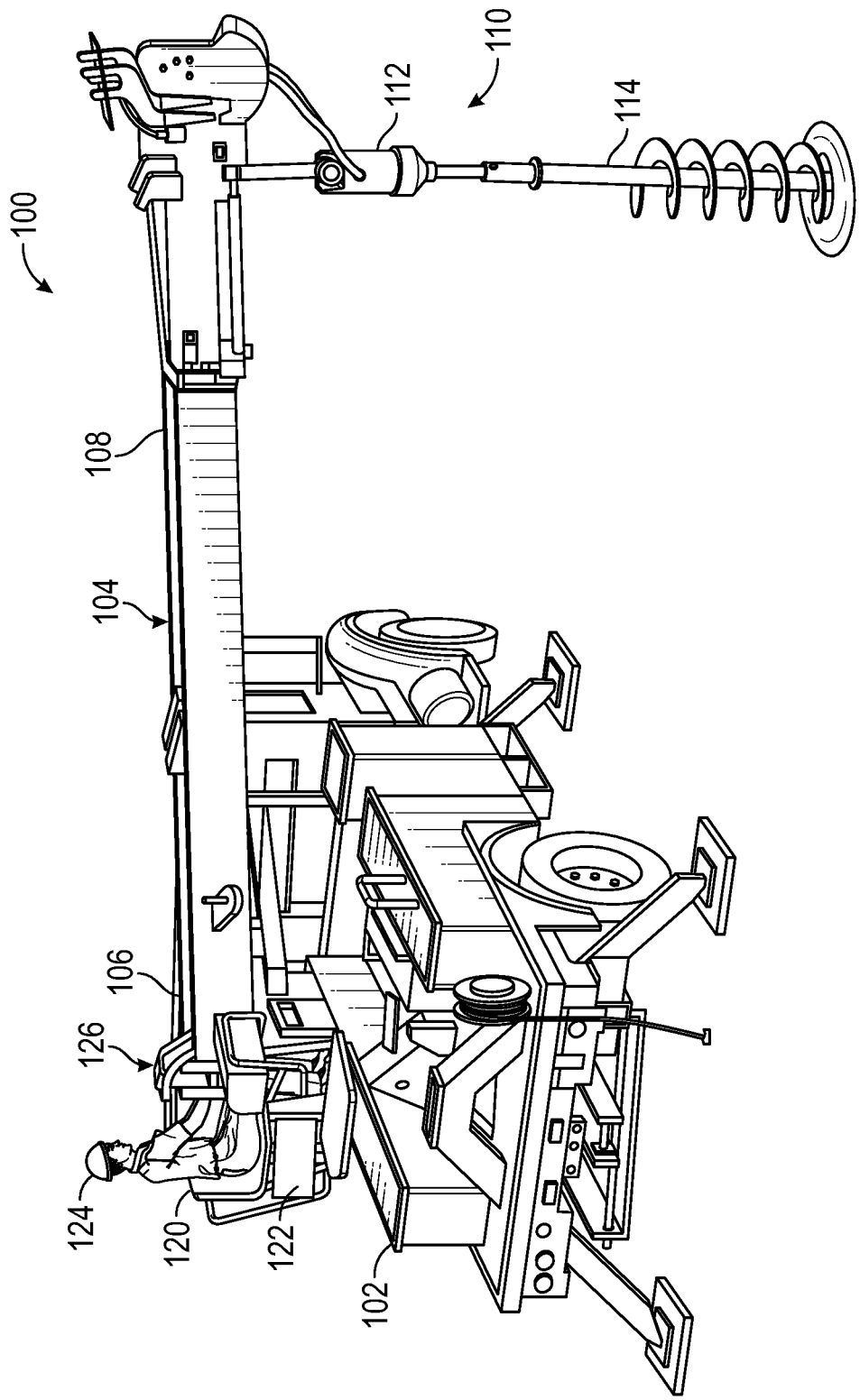
FIG. 1 shows a digger derrick system relating to some embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Turning first to FIG. 1, a mobile hydraulic equipment is depicted relating to some embodiments and is referred to generally by reference numeral 100. The mobile hydraulic equipment 100, in some embodiments, comprises a digger derrick utility vehicle 102 supporting a boom assembly 104 having a proximal end 106 and a distal end 108. In such embodiments, a digger assembly 110 is secured to the distal end 108 of the boom assembly 104. In such embodiments, the digger assembly 110 comprises a digger motor 112 and an auger 114. A heated seat 120 may be secured at the proximal end 106 of the boom assembly 104 positioned above the utility vehicle 102. In some embodiments, a heat exchanger 122 is disposed adjacent to the heated seat 120, such as beneath the heated seat 120, as shown. The heated seat 120 is configured to support an operator 124. In some embodiments, the operator 124 may have access to a boom input device 126 disposed on the boom assembly 104, as shown, for controlling the boom assembly 104. In some embodiments, the boom input device 126 is configured to receive inputs for setting a set point temperature of the heated seat 120.

The heat exchanger 122 is configured to transfer heat from a return fluid of the mobile hydraulic equipment 100 to the heated seat 120. Accordingly, heat is absorbed from the return fluid, which in some embodiments, is a hydraulic oil for powering hydraulic components of the digger derrick utility vehicle 102. In some embodiments, it is desirable to absorb heat from the return fluid to thereby cool the return fluid. Accordingly, the temperature of the return fluid may be decreased and an oil cooler may not be needed or, if included, the load on the oil cooler is reduced thereby reducing the energy consumption associated with running the oil cooler. In some embodiments, it may be desirable to maintain the return fluid below or above a certain threshold temperature to maintain a desired viscosity of the return fluid for operation of the mobile hydraulic equipment 100.

It should be understood that the digger derrick example of the mobile hydraulic equipment 100 shown in FIG. 1 is just one example of the mobile hydraulic equipment 100 with which the heated seat 120 may be used and that various other types of mobile hydraulic equipment are contemplated, such as, for example, a crane, a tractor, an aerial boom device, or a skid loader. In such embodiments, the heated seat 120 may be disposed at various positions according to each respective application. For example, in one embodiment, the mobile hydraulic equipment system 100 comprises an insulated aerial device and the heated seat 120 is disposed on an aerial work platform secured to a distal end of a boom assembly of the insulated aerial device. Alternatively, if the mobile hydraulic equipment system 100 comprises a tractor having a cab, the heated seat 120 may be disposed within the cab.

Figure 2:
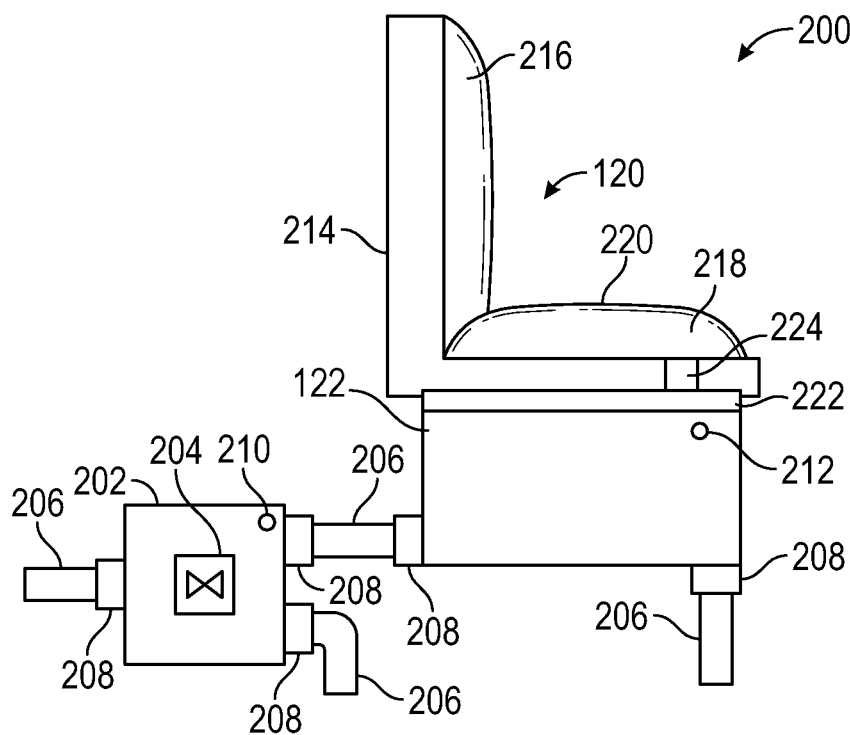
FIG. 2 shows a heated seat system relating to some embodiments of the invention.

Turning now to FIG. 2, a heated seat system 200 is depicted relating to some embodiments. Heated seat system 200 comprises the heated seat 120 and heat exchanger 122 as described above with reference to FIG. 1. In some embodiments, heated seat system 200 further comprises a diverter manifold 202 having at least one valve 204. The valve 204 may be one of an adjustable flow valve, a hydraulic control valve, such as a solenoid valve or spool valve, a simple opened/closed valve, or another suitable type of valve. In some embodiments, the valve 204 may be electrically actuated from an electric signal or mechanically actuated via a lever or knob. Alternatively, in some embodiments, the valve 204 may be actuated using a pressure signal, though it should be understood that any suitable means of actuation may be used. In some embodiments, a plurality of valves may be included.

In some embodiments, a fluid channel 206 is disposed between the diverter manifold 202 and the heat exchanger 122. The fluid channel 206 may be, for example, piping, tubing, or other type of suitable fluid channel operable to transfer fluid between components. In some embodiments, all or a portion of the fluid channel 206 may be composed of plastic or metal tubing. In some embodiments, the fluid channel 206 may include an insulation layer such as mineral wool, glass wool, foam, rubber, or another suitable type of pipe insulation on at least a portion thereof. In some embodiments, the fluid channel 206 may be thermally insulated to reduce heat loss from the fluid within the fluid channel 206. It should be understood that, in some embodiments, various other components may additionally or alternatively be thermally insulated, such as, for example, the diverter manifold 202 and portions of the heat exchanger 122. In some embodiments, a plurality of connection ports 208 may be included for fluidly connecting the diverter manifold 202 to the fluid channel 206, and the fluid channel 206 to the heat exchanger 122, as well as for connecting various other components. In some embodiments, the connection ports 208 may include valves.

In some embodiments, the heated seat system 200 further comprises a first temperature sensor 210 disposed within the diverter manifold 202 and a second temperature sensor 212 disposed within the heat exchanger 122. The first temperature sensor 210 may be configured to measure a temperature of the diverter manifold 202 or a temperature of a fluid within the diverter manifold 202. The second temperature sensor 212 may be configured to measure a temperature of the heat exchanger 122 or a temperature of a fluid within the heat exchanger 122.

In some embodiments, the heated seat 120 comprises a rigid frame 214 for supporting the heated seat 120, a backrest 216 secured to the rigid frame 214, a seat cushion 218 positioned over the rigid frame 214, and a covering 220 disposed over at least one of the seat cushion 218 and the backrest 216 configured to be adjacent a user. The seat cushion 218 and/or backrest 216 may be composed of a soft material such as foam or another suitable pliable material. The covering 220 may be composed of a fabric material, such as for example vinyl or leather. The heated seat system 200, in some embodiments, further comprises a barrier 222 disposed between the heat exchanger 122 and the heated seat 120 to prevent fluid leakage of fluid from the heat exchanger 122 through the heated seat 120. Alternatively, in some embodiments, the barrier 222 is disposed underneath the covering 220, such as underneath an outer fabric layer of the covering. The barrier 222 may be composed of a durable fabric material, such as, nylon, polyester, or another suitable fluid resistant fabric.

In some embodiments, a waterproof fabric material or liquid impermeable material may be used for the barrier 222. Alternatively, in some embodiments, the barrier 222 is a rigid barrier composed of a liquid impermeable and thermally conductive material such that heat transfer is allowed between the heat exchanger 122 and the heated seat 120 while preventing fluid from leaking into the seat 120. For example, in one embodiment, the barrier 222 comprises an aluminum plate disposed between the heat exchanger 122 and the seat 120.

In some embodiments, the heated seat 120 is an existing seat of the mobile hydraulic equipment that is retrofitted with the heat exchanger 122 and other components, such that the seat is configured to be heated using the return fluid. Accordingly, the heat exchanger 122 and diverter manifold 202 may be installed on existing mobile hydraulic equipment. Alternatively, in some embodiments, the heated seat 120 is initially manufactured with heating components as explained herein, such as the heat exchanger 122.

Additionally, in some embodiments, the heated seat system 200 further comprises an input device 224 disposed on or adjacent to the heated seat 120, as shown. The input device 224 is configured to receive at least one operator input. Said operator input may be any one of: receiving an operator-specified set point temperature, an input to turn the heated seat 120 on or off, or another control signal. In some embodiments, the input device 224 may be the same as boom input device 126. Alternatively, the input device 224 may be included in place of or in addition to the boom input device 126. In some embodiments, the input device 224 comprises any of a number pad, a plurality of dials, a plurality of switches, a plurality of buttons, or other input mechanisms. Further, in some embodiments, the input device 224 comprises a display for displaying a user interface. In such embodiments, the display may be provided as a digital display showing a desired set point temperature and a measured temperature. In some embodiments, the user may be able to select a particular heat setting such as low, medium or high.

Figure 3:
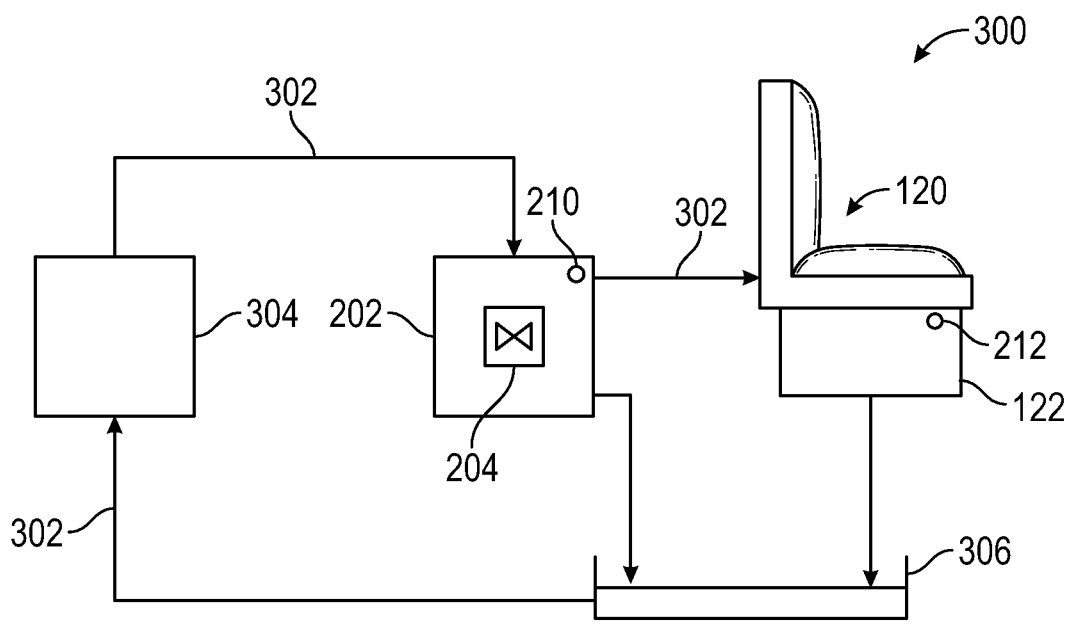
FIG. 3 shows a heated seat schematic relating to some embodiments of the invention.

Turning now to FIG. 3, a schematic of a system for providing heating to heated seat 120 is depicted relating to some embodiments and is referred to generally by reference numeral 300. The system 300 includes the heated seat 120, heat exchanger 122, as well as the diverter manifold 202 with the valve 204. In some embodiments, the system 300 also includes a plurality of fluid channels 302 configured to transfer a return fluid between various components of the system 300. In some embodiments, the fluid channels 302 are similar to the fluid channels 206. Accordingly, the plurality of fluid channels 302 may comprise the fluid channels 206 between the diverter manifold 202 and the heat exchanger 122.

The return fluid may be received into the diverter manifold 202 through one of the fluid channels 302 from a primary process 304. In some embodiments, the primary process 304 may be a process of the mobile hydraulic equipment 100, such as for example, hydraulically driving the digger motor 112, hydraulically extending/retracting the boom assembly 104, or another function of the mobile hydraulic equipment 100. It should be understood, that in some embodiments, the primary process 304 may either intentionally or unintentionally heat the return fluid. For example, if the primary process 304 includes hydraulically driving the digger motor 112, the process will cause the fluid within a hydraulic circuit of the digger assembly 110 to heat up. Accordingly, the return fluid received by the diverter manifold 202 will carry heat from the process of driving the digger motor 112. In order to take advantage of this heat generated, the return fluid may be used to heat seat 120. Here, the heating of the heated seat 120 may be considered an auxiliary function of the return fluid.

In some embodiments, the return fluid is one of hydraulic oil, water, engine oil, or another suitable return fluid utilized in the primary process 304. For example, in one embodiment, the return fluid is mineral oil used to provide hydraulic power for extending and retracting a boom of the mobile hydraulic equipment, such as the boom assembly 104. Further, in some embodiments, the return fluid is configured to simultaneously provide hydraulic power to the mobile hydraulic equipment 100 while heating the heated seat 120.

In the system 300, the diverter manifold 202 is operable to route all or a portion of the return fluid to a return fluid reservoir 306 in a first configuration of the valve 204. The return fluid reservoir may be a component of the mobile hydraulic equipment 100. For example, if the mobile hydraulic equipment 100 includes the digger derrick utility vehicle 102, as shown in FIG. 1, the return fluid reservoir 306 may be a hydraulic fluid tank or cooling tank of the digger derrick utility vehicle 102. In some embodiments, the return fluid reservoir 306 stores the return fluid before the return fluid is used within the primary process 304.

The diverter manifold 202 is alternatively operable to route all or a portion of the return fluid to the heat exchanger 122 in a second configuration of the valve 204. Here, the return fluid is passed into the heat exchanger 122 to provide heating to the heat exchanger 122, thereby heating the heated seat 120. After passing through the heat exchanger 122 the return fluid is routed to the return fluid reservoir 306.

Figure 4:
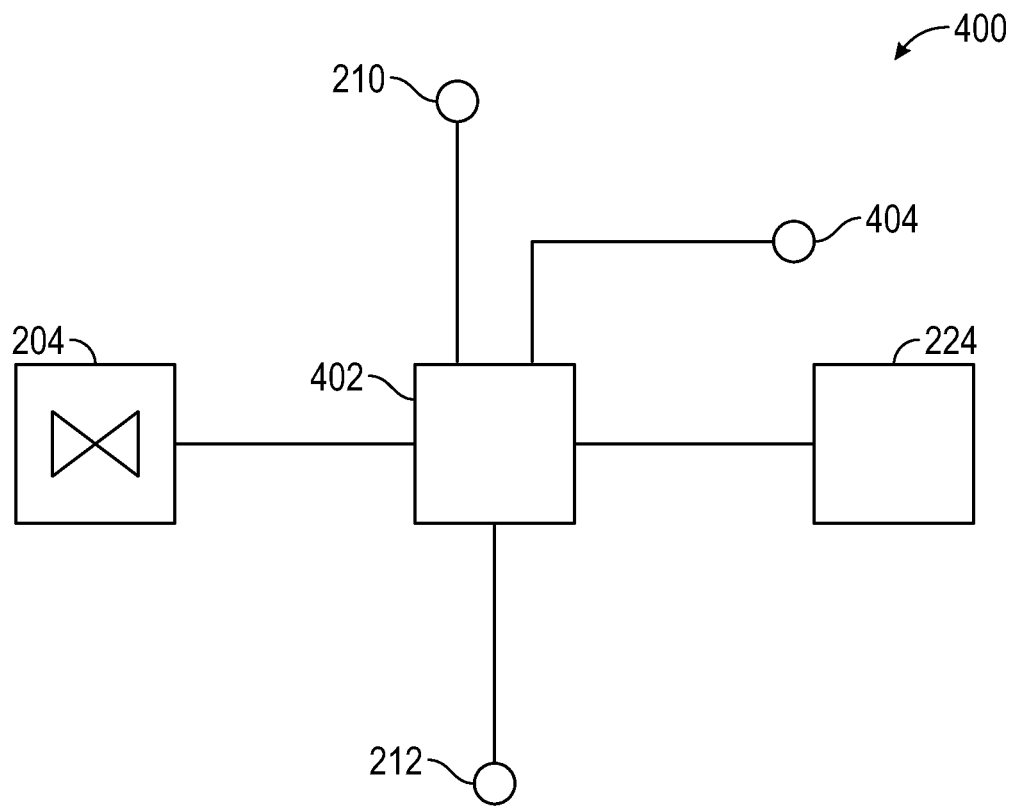
FIG. 4 shows a control system relating to some embodiments of the invention.

Turning now to FIG. 4, a control system is depicted relating to some embodiments and referred to generally by reference numeral 400. The control system 400 comprises the valve 204, the first temperature sensor 210, the second temperature sensor 212, the input device 224, and a controller 402. In such embodiments, the controller 402 may be a suitable control unit such as a logic control unit or other computing device. In some embodiments, the controller 402 comprises a processor for processing information, such as a temperature signal received from one of the first temperature sensor 210 or the second temperature sensor 212. Accordingly, the controller 402 may be electrically connected to at least one of the valve 204, the first temperature sensor 210, the second temperature sensor 212, and the input device 224. Alternatively, said components may be communicatively connected through another suitable communication technique, such as wired communication, wireless communication, fiber optic communication, or any combination thereof. Although two temperature sensors are shown here, in some embodiments, only one temperature sensor or more than two temperature sensors may be utilized.

In some embodiments, the controller 402 is configured to receive signals from each of the first temperature sensor 210, the second temperature sensor 212, and the input device 224, and output a control signal to the valve 204. In some embodiments, the control signal output to the valve is based on at least one of the signals received by the controller 402. The control signal is operable to adjust a setting or configuration of the valve 204. For example, the control signal may shift the valve 204 between the first configuration and the second configuration.

Alternatively, in some embodiments, the control signal will control a flow through the valve 204. For example, the flow through the valve 204 may be adjusted such that a first portion of the return fluid is routed to the heat exchanger 122 and a second portion of the return fluid is routed directly to the return fluid reservoir 306. In some cases, it may be desirable to granularly adjust the amount of flow to either of the heat exchanger 122 or the return fluid reservoir 306. Accordingly, a volumetric ratio of the first portion to the second portion of the return fluid may be adjusted according to the control signal.

In some embodiments, the control system 400 further comprises a third temperature sensor 404 for measuring an ambient temperature. In some such embodiments, the third temperature sensor 404 may be disposed on an exterior of the mobile hydraulic equipment and in electrical communication with the controller 402. The third temperature sensor 404 may transmit a signal indicative of the ambient temperature to the controller 402. Accordingly, in some embodiments, the controller 402 may further consider the ambient temperature while controlling the valve 204. Here, it may be desirable to measure the ambient temperature to determine when heating may be necessary for the heated seat 120. Accordingly, when the ambient temperature is relatively cold, the controller 402 may set the configuration of the valve 204 to the second configuration to provide heating to the seat 120 from the return fluid. For example, if the third temperature sensor 404 reads an ambient temperature that is below freezing, the heated seat 120 may be automatically activated by opening the valve 204 to allow the return fluid to flow into the heat exchanger 122.

In some embodiments, the controller 402 may be operable to predict a heat rise curve of the return fluid within the heat exchanger 122 based on the second temperature. The controller 402 may use the heat rise curve to maintain the temperature of the heated seat 120 at or near the requested temperature set point. Accordingly, the controller 402 may preemptively adjust the valve 204 to prevent the heat exchanger from overshooting the requested temperature set point. Further, in some embodiments, the controller 402 may include a feedback control loop used to reduce temperature overshoot.

Figure 5:
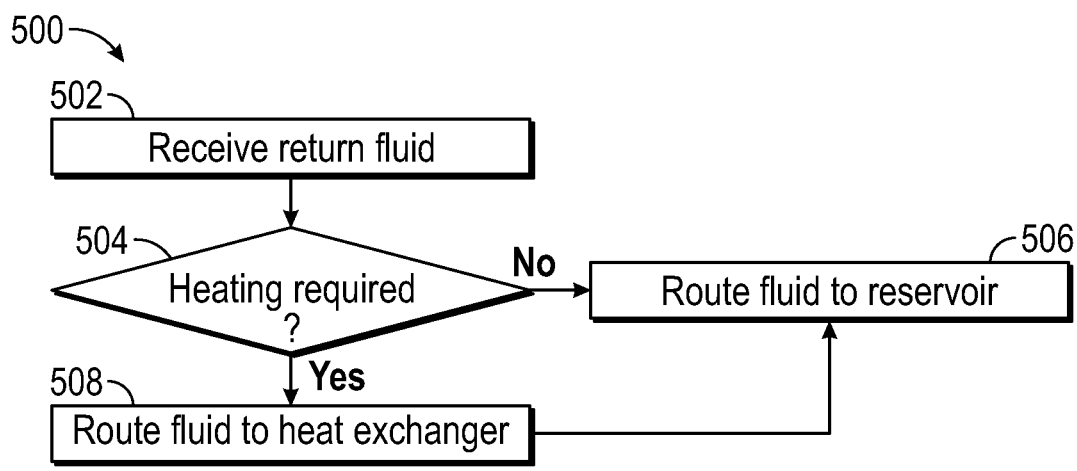
FIG. 5 shows a method for heating a seat relating to some embodiments of the invention.

Turning now to FIG. 5, a method for heating the heated seat 120 is depicted relating to some embodiments and is referred to generally by reference numeral 500. At step 502, the return fluid is received into the diverter manifold 202. At step 504, it is determined whether heating is required. In some embodiments, this determination may be made according to at least one of an input to the input device 224 and the temperatures, as read by temperature sensors 210, 212, and 404. If heating is not required the return fluid is routed directly to the return fluid reservoir 306 at step 506. Alternatively, if heating is required, the return fluid is diverted to the heat exchanger 122 at step 508. Here, the return fluid may supply heating to the heat exchanger 122 to thereby provide heat to the heated seat 120. After the return fluid passes through the heat exchanger 122, the return fluid is routed to the return fluid reservoir 306 at step 506. In some embodiments, routing the return fluid to either of the heat exchanger 122 or the return fluid reservoir 306 is accomplished by a control signal sent from the controller 402 to the valve 204 to adjust the configuration of the valve 204.

Figure 6A:
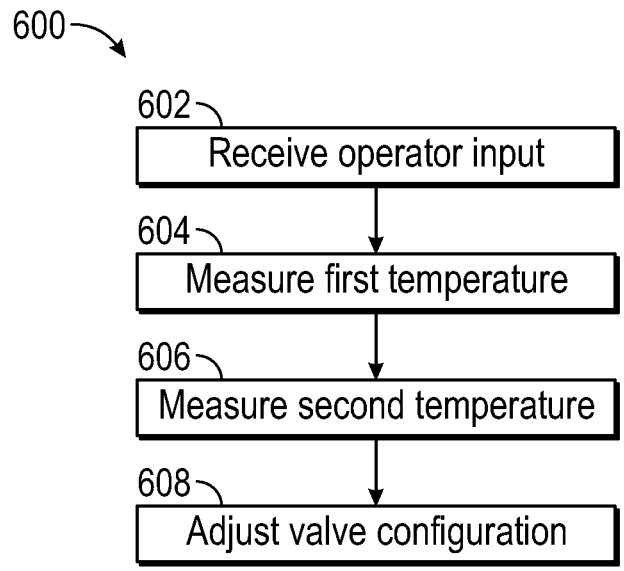
FIGS. 6A and 6B show a method for controlling heating of a heated seat relating to some embodiments of the invention.
Figure 6B:
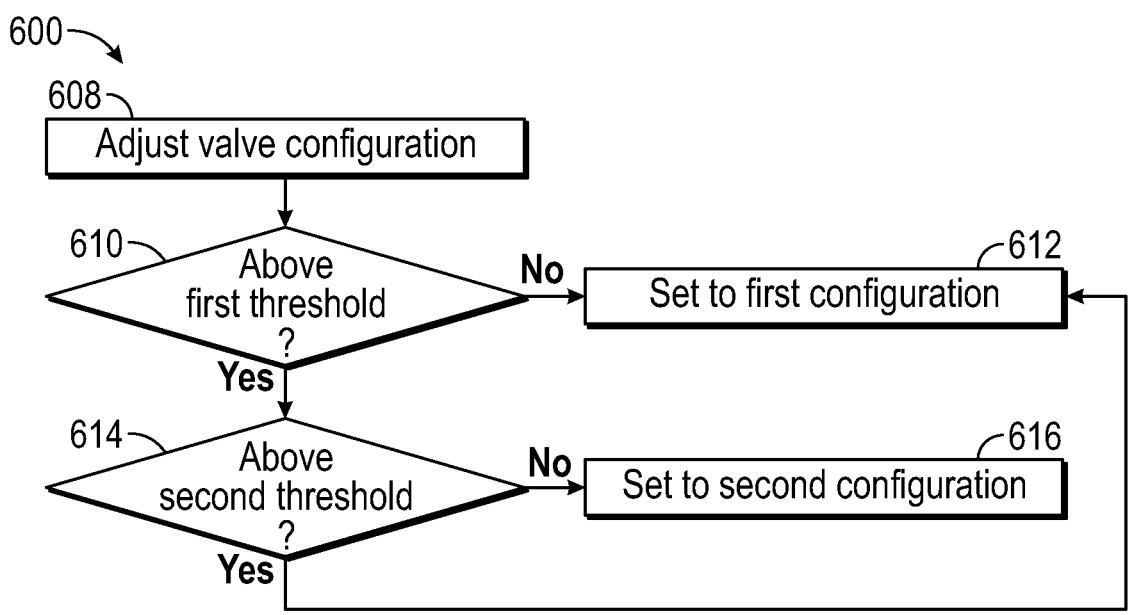

Turning now to FIGS. 6A-B, a method for controlling heating of the heated seat 120 is depicted relating to some embodiments and referred to generally by reference numeral 600. At step 602, an operator input is received. The operator input may be received into the input device 224 and transferred to the controller 402 as a communication signal. In some embodiments, the operator input is indicative of a temperature set point requested by the operator 124.

At step 604, a first temperature is measured by the first temperature sensor 210 indicative of the temperature of the return fluid within the diverter manifold 202. Here, a signal indicative of the measured first temperature may be communicated to the controller 402. At step 606, a second temperature is measured by the second temperature sensor 212 indicative of the temperature of the return fluid within the heat exchanger 122. Here, a signal indicative of the measured second temperature may also be communicated to the controller 402. At step 608, the valve 204 is adjusted according to the control signal sent from the controller 402 based on the received operator input at step 602, the first temperature measured at step 604, and the second temperature measured at step 606. In some embodiments, the valve 204 may be adjusted to shift the valve 204 between the first configuration and the second configuration.

FIG. 6B depicts an example of how step 608 may be performed in some embodiments. At step 610, it is determined whether the first temperature is above a first threshold. In some embodiments, the first threshold is based on the requested temperature set point. For example, the first threshold may be a temperature at or near the temperature set point. In some embodiments, the first threshold may be based further on a safety standard. If the first temperature is not above the first threshold, the valve is set to the first configuration at step 612. If the first temperature is above the first threshold the process continues to step 614.

At step 614, it is determined whether the second temperature is above a second threshold. Similar to the first threshold, the second threshold may be based on the temperature set point and, in some embodiments, further on a safety standard. It may be desirable that the second threshold is based on such a safety standard to ensure that the heated seat 120 is not heated to dangerous temperatures which would damage the heated seat 120 or harm the operator 124. If the second temperature is not above the second threshold it is determined that heating is required and the valve 204 is set to the second configuration at step 616. If it is determined that the second temperature is above the second threshold, the valve 204 is set to the first configuration at step 612.

Accordingly, the steps shown in FIG. 6B depict an exemplary approach to determining whether heating is required. It should be understood that, in some embodiments, a similar process, as shown in FIG. 6B, may be carried out at step 504 of FIG. 5. Alternatively, other approaches for determining whether heating is required are contemplated. For example, the determination may further depend on the ambient temperature, as read by the third temperature sensor 404.

Figure 7A:
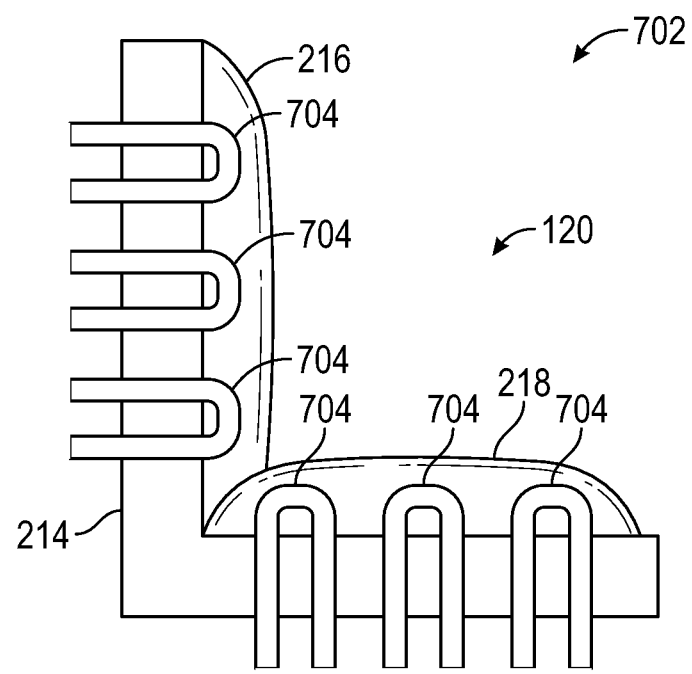
FIG. 7A shows a cross-sectional view of a heated seat including a plurality of fluid channels relating to some embodiments of the invention.

Turning now to FIG. 7A, a cross-sectional view of the heated seat 120 is shown relating to some embodiments. As shown, in some embodiments, the heated seat 120 may comprise a fluid channel heat exchanger 702 consisting of a plurality of fluid channels 704 disposed within the seat, such as beneath or within the seat cushion 218 and/or backrest 216 of the seat. The fluid channels 704 allow fluid to flow through the heated seat 120 to thereby release heat into the seat. In some embodiments, the fluid flowing through the fluid channels is the return fluid. In some embodiments, a second fluid is circulated through the heated seat, as will be discussed below with respect to FIG. 7B. It may be desirable to include the plurality of fluid channels 704 within the heated seat 120 to evenly distribute heating throughout the heated seat 120.

It may be desirable to provide heating to both the seat cushion 218 and the backrest 216 of the heated seat. Accordingly, in some embodiments, at least a first portion of the plurality of fluid channels is disposed within the seat cushion 218 of the heated seat while a second portion of the fluid channels is disposed within the backrest 216 of the heated seat, as shown. In some embodiments, heating for the backrest 216 and the seat cushion 218 is selectively configured according to an operator input into the input device 224. For example, an operator may provide an input into input device 224 causing the first portion of fluid channels in the seat cushion 218 to be activated and the second portion of fluid channels in the backrest 216 to be deactivated, such that only the seat cushion 218 is heated.

Figure 7B:
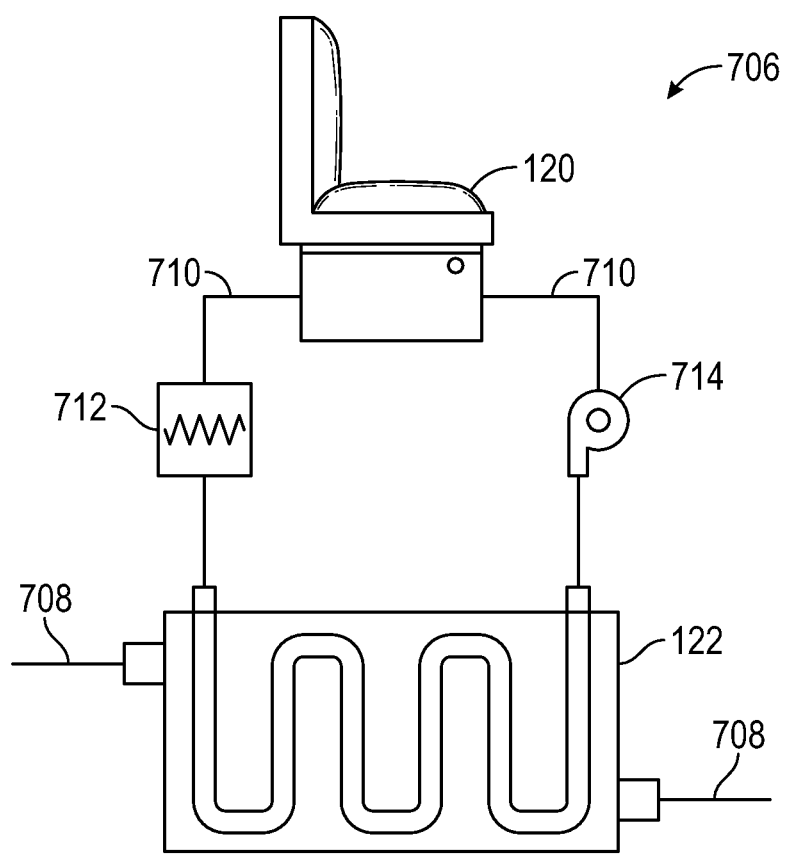
FIG. 7B shows a dual circuit heating system for heating a seat relating to some embodiments of the invention.

Turning now to FIG. 7B, a dual circuit heating system 706 is depicted for the heated seat 120 relating to some embodiments. The dual circuit heating system 706 comprises a first heating circuit 708 and a second heating circuit 710. Here, the first heating circuit 708 is a fluid circuit including the return fluid flowing through the heat exchanger 122. In some embodiments, the first heating circuit 708 receives the return fluid from the primary process 304 and routes the return fluid through the heat exchanger 122 and then to the return fluid reservoir 306. The second heating circuit 710 is a second fluid circuit including a second fluid flowing through the heat exchanger 122, drawing heat from the return fluid, and flowing back through the heated seat 120. In some embodiments, the second heating circuit 710 includes the fluid channel heat exchanger 702 with fluid channels 704 disposed within the heated seat 120, as shown in FIG. 7A. In such embodiments, the heat exchanger 122 is configured to exchange heat from the return fluid to the second fluid. It should be understood that fluid circuit, as used herein refers to a fluid path created between various components allowing a fluid to flow between said components.

Further, in some embodiments, the second heating circuit 710 may include the second fluid at a relatively low pressure compared to the pressure of the return fluid in the first heating circuit 708. It may be desirable that the pressure of the second fluid be lower to increase the safety of the heated seat 120. For example, hydraulic oil at a high temperature and high pressure may be dangerous and harmful for an operator. Accordingly, contact between the operator 124 and the high pressure return fluid is avoided by including the second heating circuit 710 with the second fluid at a relatively low pressure. In some embodiments, the second fluid may be, for example, water, hydraulic oil at a lower pressure, coolant, ethylene glycol, or any another suitable heat transfer fluid.

In some embodiments, a separate auxiliary heater 712 may be included to provide supplemental or alternative heating to at least one of the return fluid in the first heating circuit 708 or the second fluid in the second heating circuit 710. For example, the auxiliary heater 712 may be disposed within the second heating circuit 710 in the fluid path between the heat exchanger 122 and the heated seat 120, as shown in FIG. 7B. The separate auxiliary heater 712 may be an electrically resistive heater or another suitable type of heater. Alternatively, in some embodiments, the auxiliary heater 712 may comprise an orifice or a pressure relief valve to thereby passively heat either of the return fluid or the second fluid. For example, in some embodiments, the second fluid may be directed through an orifice plate to increase the temperature of the second fluid. Accordingly, heat is generated within at least one of the fluids without inputting additional energy, such as, in the case of an electric heater. In some embodiments, the auxiliary heater 712 may be powered by an auxiliary power source of the mobile hydraulic equipment 100, such as a battery. In some embodiments, the auxiliary heater 712 may be used to provide heating when the temperature of the return fluid is relatively low, such as when the mobile hydraulic equipment 100 is initially started and the ambient temperature is low. In some such embodiments, the auxiliary heater 712 may be controlled by the controller 402. Accordingly, the controller 402 is configured to power on and power off the auxiliary heater 712, as well as, in some embodiments, to increase or decrease a heating power setting of the auxiliary heater 712.

Additionally, in some embodiments, at least one pump 714 may be included to actively pump either of the return fluid or the second fluid through the circuit 710. For example, in some embodiments, the pump 714 may be disposed along the second heating circuit 710 before the heat exchanger 122 to pump the second fluid through the second heating circuit 710. In such embodiments, the pump 714 may provide the second fluid at a substantially lower pressure than the return fluid in the first heating circuit 708.

Figure 7C:
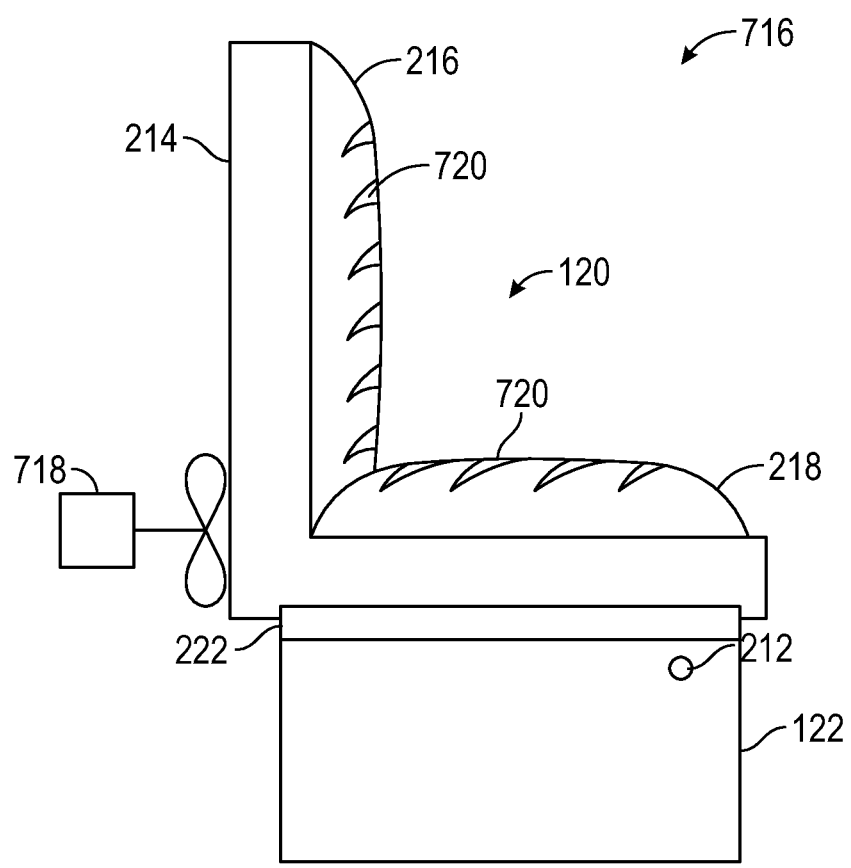
FIG. 7C shows a convection heating system for heating a seat relating to some embodiments of the invention.

Turning now to FIG. 7C, a convection heating system 716 for the heated seat 120 is depicted relating to some embodiments. In such embodiments, the convection heating system comprises at least one fan 718 disposed within or adjacent to the heated seat 120 for providing airflow within or over the heated seat 120. The convection system further comprises a plurality of slits 720 in the covering 220 of the backrest 216 and/or the seat cushion 218 of the heated seat 120 to allow airflow out of the heated seat 120. The convection heating system 716 may be provided to increase the heat transfer rate between the heat exchanger 122 and the heated seat 120 by means of convection. In some embodiments, the fan 718 may include a plurality of power settings which may be selected according to an operator input, such as for example, an operator selecting a fan power on the input device 224. Alternatively, in some embodiments, the power setting of the fan 718 may be controlled by a control signal sent from the controller 402.

It should be understood that the fan 718 may be positioned in various locations with respect to the heated seat 120. For example, the fan 718 may be disposed on a back of the rigid frame 214 of the heated seat 120 to force warmed air through the heated seat 120 and the backrest 216. Alternatively, the fan 718 may be disposed within a bottom of the heated seat 120 to force air upwards through the seat cushion 218. Further, in some embodiments, the heated seat 120 may comprise a plurality of fans disposed within the heated seat 120. In some embodiments, the fan 718 may be an electrically powered fan powered by electricity from the auxiliary power source described above with reference to FIG. 7B.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A system for recirculating heat in a mobile hydraulically powered equipment, the system comprising:
    a seat attached to the mobile hydraulically powered equipment configured to support an operator of the mobile hydraulically powered equipment;
    a heat exchanger disposed within or adjacent to the seat having a first circuit for receiving a pressurized hydraulic first fluid from a hydraulic fluid channel of the mobile hydraulically powered equipment and a second circuit for receiving a second fluid, the heat exchanger configured to transfer heat from the pressurized hydraulic first fluid to the second fluid,
    wherein the second fluid is at a lower pressure than the pressurized hydraulic first fluid,
    wherein the second circuit circulates the second fluid through the seat to thereby provide heating to the seat;
    a diverter manifold for receiving the pressurized hydraulic first fluid from the mobile hydraulically powered equipment, the diverter manifold comprising a valve for selectively diverting the pressurized hydraulic first fluid to one of the heat exchanger or a return fluid reservoir of the mobile hydraulically powered equipment,
    wherein the pressurized hydraulic first fluid is heated while providing hydraulic power within the mobile hydraulically powered equipment;
    a first temperature sensor disposed within the diverter manifold to measure a temperature of the pressurized hydraulic first fluid within the diverter manifold;
    a controller for controlling the valve of the diverter manifold based on a received operator input and the temperature measured by the first temperature sensor; and
    a fluid impermeable barrier disposed between the heat exchanger and the seat configured for preventing fluid leakage into the seat.

2. The system of claim 1, wherein the pressurized hydraulic first fluid is a hydraulic oil configured to provide hydraulic power to the mobile hydraulically powered equipment.

3. The system of claim 1, further comprising a second temperature sensor disposed within the heat exchanger to measure a temperature of at least one fluid within the heat exchanger.

4. The system of claim 1, further comprising a second heat exchanger disposed within a cab of the mobile hydraulically powered equipment to provide heating to the cab, wherein the second heat exchanger receives the pressurized hydraulic first fluid from the diverter manifold.

5. The system of claim 1, further comprising an oil cooler disposed in a fluid path between the diverter manifold and the return fluid reservoir for cooling the pressurized hydraulic first fluid.

6. The system of claim 1, wherein the valve is an adjustable flow valve and the controller is configured to control the adjustable flow valve to adjust a flow of the pressurized hydraulic first fluid through the diverter manifold.

7. A method for heating a seat of a mobile hydraulically powered equipment, the method comprising:
    providing hydraulic power to the mobile hydraulically powered equipment using a pressurized hydraulic return fluid,
    wherein the pressurized hydraulic return fluid receives heat from the mobile hydraulically powered equipment while providing hydraulic power;
    receiving the pressurized hydraulic return fluid from a hydraulic fluid channel of the mobile hydraulically powered equipment into a diverter manifold;
    in a first configuration of an adjustable flow valve disposed within the diverter manifold, diverting at least a portion of the pressurized hydraulic return fluid into a hydraulic return fluid reservoir of the mobile hydraulically powered equipment;
    in a second configuration of the adjustable flow valve disposed within the diverter manifold, diverting at least a portion of the pressurized hydraulic return fluid into a heat exchanger disposed at least partially within the seat to thereby provide heating to the seat;
    measuring a first temperature of the pressurized hydraulic return fluid using a first temperature sensor disposed within the diverter manifold;
    measuring a second temperature of the pressurized hydraulic return fluid using a second temperature sensor disposed within the heat exchanger;
    controlling the heating of the seat using a controller to adjust the adjustable flow valve between one of the first configuration and the second configuration based on a received operator input, the first temperature, and the second temperature to thereby adjust a flow of the pressurized hydraulic return fluid; and
    preventing leakage of the pressurized hydraulic return fluid into the seat using a fluid impermeable barrier disposed between the heat exchanger and at least a portion of the seat.

8. The method of claim 7, further comprising:
    transferring heat from the pressurized hydraulic return fluid to a second fluid in the heat exchanger; and
    transferring heat from the second fluid to the seat via a plurality of fluid channels disposed within the seat.

9. The method of claim 7, further comprising: receiving an operator input into the controller indicative of a desired temperature set point.

10. The method of claim 9, further comprising: if the first temperature is above a first threshold associated with the desired temperature set point and the second temperature is below a second threshold associated with the desired temperature set point, adjusting the valve to the second configuration.

11. The method of claim 10, further comprising: if the first temperature is below the first threshold associated with the desired temperature set point, adjusting the valve to the first configuration.

12. The method of claim 11, further comprising: if the second temperature is above the second threshold associated with the desired temperature set point, adjusting the valve to the first configuration.

13. The method of claim 7, further comprising:
predicting a heat rise curve of the heat exchanger to maintain a desired temperature set point of the seat and to prevent temperature overshoot of the heat exchanger,
wherein the heat rise curve is predicted based at least in part on the first temperature and the second temperature.

14. A heated seat for a mobile hydraulically powered equipment, the heated seat comprising:
a frame;
a cushion for supporting a user thereon secured to the frame;
a covering on the cushion;
a heat exchanger configured to receive a pressurized hydraulic return fluid from a diverter manifold of the mobile hydraulically powered equipment, and to provide heating to the heated seat,
wherein the pressurized hydraulic return fluid is heated while providing hydraulic power within the mobile hydraulically powered equipment; and
a first temperature sensor disposed within the heat exchanger to measure a first temperature of at least one fluid within the heat exchanger,
wherein the diverter manifold comprises a selectively controllable valve configured to direct the pressurized hydraulic return fluid to a hydraulic return fluid reservoir in a first configuration and to direct the pressurized hydraulic return fluid to the heat exchanger in a second configuration based at least in part on the first temperature of the at least one fluid within the heat exchanger.

15. The heated seat of claim 14, further comprising a fluid impermeable barrier disposed underneath the covering configured for preventing fluid leakage into the heated seat.

16. The heated seat of claim 14, further comprising a plurality of fluid channels disposed within the heated seat to transfer heat to the heated seat.

17. The heated seat of claim 16, further comprising a second fluid directed through the heat exchanger to transfer heat from the pressurized hydraulic return fluid and directed through the plurality of fluid channels to transfer heat to the heated seat.

18. The heated seat of claim 14, further comprising:
a backrest secured to the frame; and
a second heat exchanger associated with the backrest configured to provide heating to the backrest.

19. The system of claim 1, wherein the fluid impermeable barrier comprises a rigid thermally conductive material for allowing heat transfer between the heat exchanger and the seat.

20. The system of claim 1, wherein the fluid impermeable barrier comprises a durable fabric material.

* * * * *